United States Patent

Schloz et al.

[11] Patent Number: 4,712,716
[45] Date of Patent: Dec. 15, 1987

[54] APPARATUS FOR METERING DUSTING POWDER

[75] Inventors: Gerhard Schloz, Leinfelden-Echterdingen; Heinz Weitmann, Rosenfeld, both of Fed. Rep. of Germany

[73] Assignee: Weitmann & Konrad GmbH & Co. KG, Leinfelden-Echterdingen, Fed. Rep. of Germany

[21] Appl. No.: 905,324

[22] Filed: Sep. 8, 1986

[30] Foreign Application Priority Data

Sep. 25, 1985 [DE] Fed. Rep. of Germany ....... 3534090

[51] Int. Cl.$^4$ .......................... B67D 5/58; G01F 11/00
[52] U.S. Cl. ..................................... 222/189; 222/199; 222/233; 222/333
[58] Field of Search .......................... 366/279, 316–317; 222/189–190, 630, 637, 196, 199–201, 222, 235, 233, 239, 242, 461, 504, 564, 333

[56] References Cited

U.S. PATENT DOCUMENTS

| 664,477 | 12/1900 | Holtzclaw | 222/201 |
|---|---|---|---|
| 1,828,519 | 10/1931 | Beall | 222/233 |
| 2,002,420 | 5/1935 | Strosk | 222/189 X |
| 3,618,828 | 11/1971 | Schinella | 222/630 X |
| 3,933,281 | 1/1976 | Uralli et al. | 222/200 |
| 4,071,170 | 1/1978 | Gunzel, Jr. et al. | 222/199 X |
| 4,129,338 | 12/1978 | Mudgett | 222/564 X |

FOREIGN PATENT DOCUMENTS 2432737 1/1976 Fed. Rep. of Germany ...... 222/630

Primary Examiner—Joseph J. Rolla
Assistant Examiner—Michael S. Huppert
Attorney, Agent, or Firm—Shenier & O'Connor

[57] ABSTRACT

An apparatus for metering dusting powder comprises a powder supply container, a stirring mechanism arranged in the supply container, a powder outlet opening at the bottom of the supply container, and an oscillating plate for metered delivery of the powder, which is provided at the outlet opening and to which an oscillatory motion is imparted by means of a shaking device. The stirring mechanism comprises a stirring blade rotating immediately above the bottom and the outlet opening of the supply container, and the oscillating plate of the shaking device executes an inharmonic oscillation consisting of a slow motion to and a quick motion fro.

16 Claims, 3 Drawing Figures

Fig. 1

APPARATUS FOR METERING DUSTING POWDER

The invention relates to an apparatus for metering dusting powder comprising a powder supply container, a stirring mechanism arranged in the supply container, a powder outlet opening at the bottom of the supply container, and an oscillating plate for metered delivery of the powder, which is provided at the outlet opening and to which an oscillatory motion may be imparted by means of a shaking device.

In a known apparatus of this kind, the stirring mechanism comprises, at different levels of the powder supply container, stirring arms which protrude from a central stirring shaft. Since the lowest stirring arm is relatively far from the bottom of the container, lumps may form in the powder and clog up the powder outlet opening. In the known apparatus, the oscillating plate is electromagnetically shaken at a relatively high frequency so as to execute a harmonic oscillation. No defined direction of conveyance is thereby imparted to the powder lying on the oscillating plate. Instead, it is thrown off the oscillating plate in both directions, which may result in irregular quantities of powder being conveyed.

The object of the invention is to remedy the above-described deficiencies and to improve a generic apparatus in such a way that, without having a tendency to clog up, it enables uniform metering and conveyance of dusting powder.

The object is achieved in accordance with the invention in that the stirring mechanism comprises a stirring blade rotating immediately above the bottom and the outlet opening of the supply container, and in that the oscillating plate of the shaking device executes an inharmonic oscillatory motion consisting of a slow motion to and a quick motion fro.

The following description of a preferred embodiment serves in conjunction with the appended drawings to explain the invention in greater detail. In the drawings.

Figure 1:
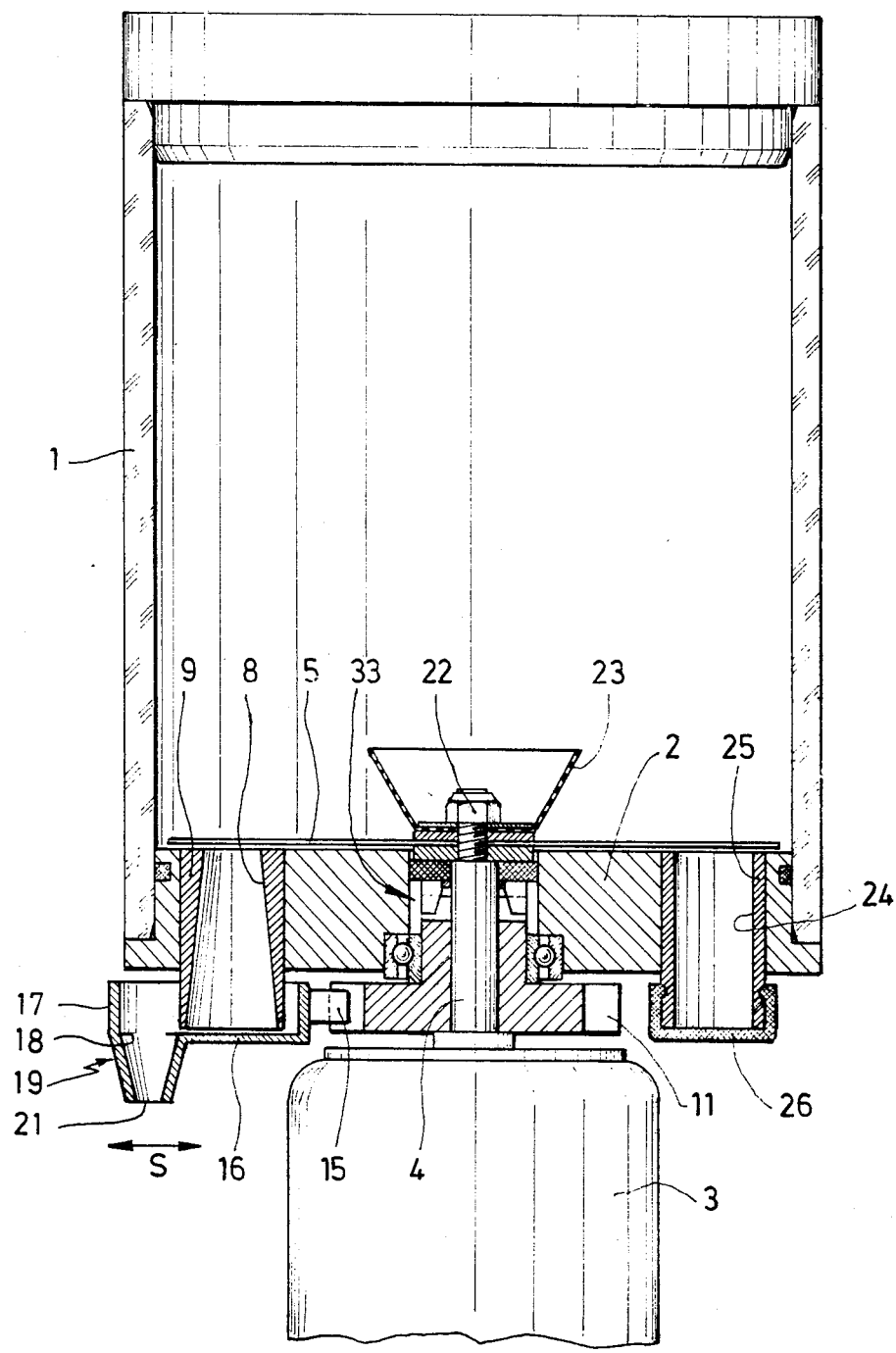
FIG. 1 shows schematically a side view of an apparatus for metering dusting powder.
Figure 2:
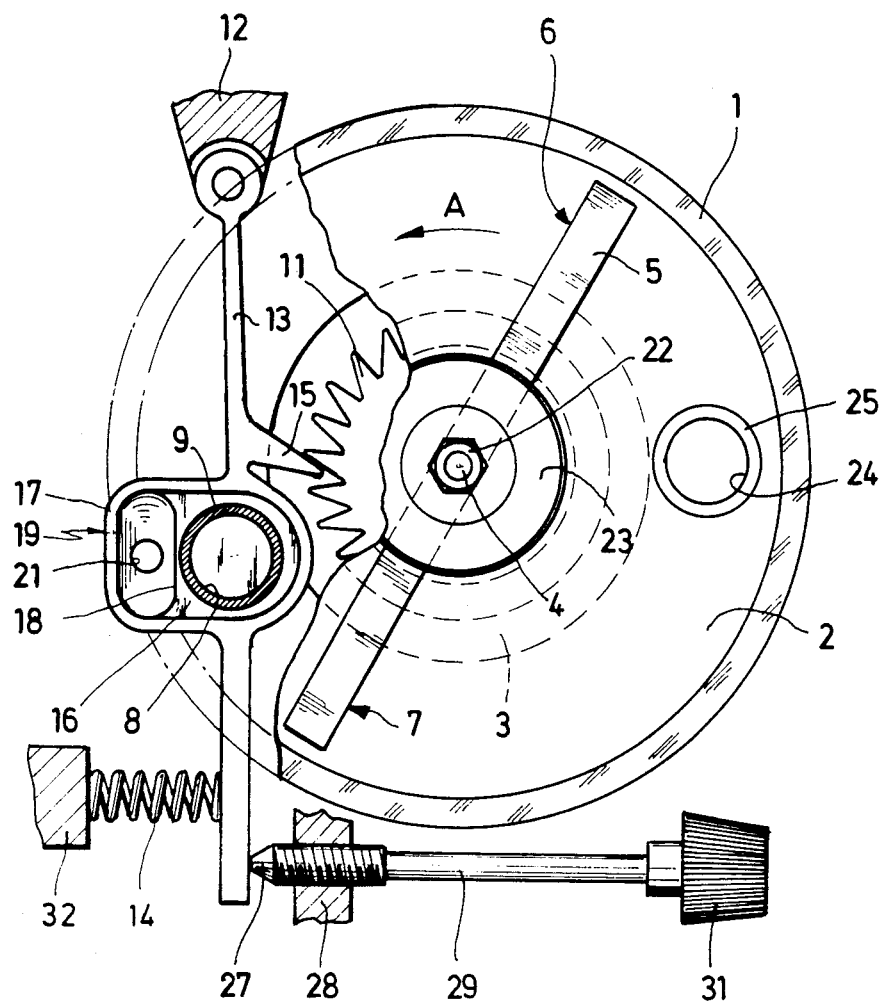
FIG. 2 shows a bottom view of the apparatus of FIG. 1.

The apparatus illustrated in FIGS. 1 and 2 for metering dusting powder comprises a circular cylindrical powder supply container 1, preferably of transparent material, with a bottom 2. Arranged beneath the bottom 2 (on a mounting which is not illustrated) is an electric motor 3. A shaft 4 of the motor 3 penetrates the bottom 2 and carries in the interior of the container 1 and immediately above the inside of the bottom 2, a relatively narrow stirring blade 5 in the form of a blade strip whose cutting areas are designated in FIG. 2 by reference numerals 6 and 7.

Provided in the bottom 2, at the side, in the proximity of the container wall, is a powder outlet opening 8, into which a downwardly protruding pipe 9 is inserted. The outlet opening 8 and the pipe 9 are stroked by the stirring blade 5 rotating with the shaft 4.

Figure 3:
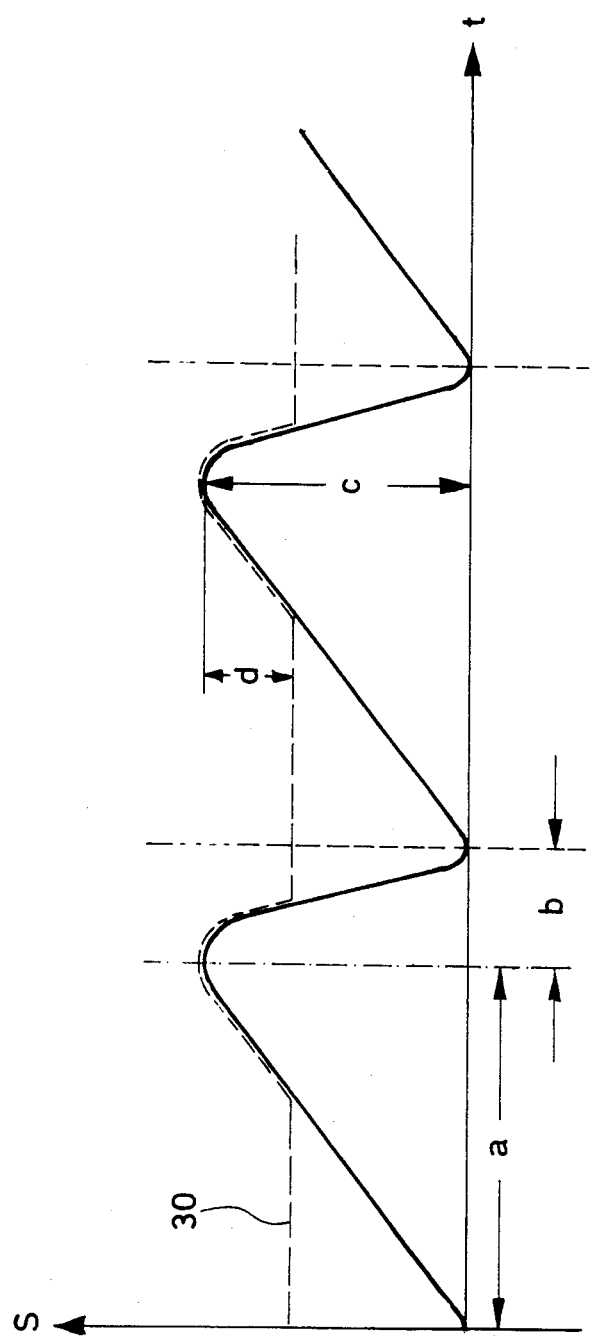
FIG. 3 shows schematically the graphic illustration of an inharmonic oscillation.

Seated on the shaft 4, beneath the bottom 2, is a cam disk 11 in the form of a toothed gear. Mounted for rotation on a mounting section 12 of the apparatus, as oscillating arm, is a lever 13 which extends substantially perpendicularly to the shaft 4 beneath the bottom 2. A helical spring 14 acts upon the free end of the (one-armed) lever 13. A follower 15 integrally connected to the lever 13 is thereby pushed against the cam disk 11. The follower 15 engages between the teeth of the cam disk 11. Due to appropriate design of the teeth, an inharmonic oscillatory motion, illustrated graphically in FIG. 3, is thereby imparted to the lever 13. The time (t) is represented on the abscissa of this figure, and the oscillation amplitude (S) on the ordinate. When the cam disk 11 rotates in the direction of arrow A (FIG. 2), the follower 15 first rests against a tooth flank and is pushed slowly towards the left against the action of the spring 14. This part of the motion is illustrated in the time section a in FIG. 3. Once the tooth tip has moved past the follower 15, the latter, and with it the lever 13, is moved quickly towards the right by the spring 14. This motion is illustrated in the time section b of FIG. 3. After that, the same motion begins once again and is repeated as long as the motor 3 is in operation. Altogether, an inharmonic oscillatory motion with a slow motion to and a quick motion fro is thus imparted to the lever 13.

Rigidly connected to the lever 13 is a horizontally extending oscillating plate 16, which is enclosed all around by an upwardly protruding edge 17, so that the oscillating plate 16 and the edge 17 together form a cup-shaped vessel, with the oscillating plate 16 constituting its bottom. Located at a short distance above the oscillating plate 16 is the free end of the pipe 9 connected to the powder outlet opening 8. As illustrated, the oscillating plate 16 comprises an off-center, slit-shaped opening 18 which merges into a funnel 19 with outflow opening 21.

The apparatus described thus far operates in the following manner:

In the supply container 1 filled with fine dusting powder, for example, magnesia, the stirring blade 5 rotates immediately above the bottom 2 and its outlet opening 8. The powder is thereby uniformly fed into the outlet opening 8 and into the pipe. The powder ultimately reaches the oscillating plate 16 which is shaken to and fro in an inharmonic manner. During the slow forward motion of the oscillating plate (towards the left in FIGS. 1 and 2), the powder is carried along. During the subsequent quick backward motion of the oscillating plate 16, the powder which has been carried along drops, on account of its inertia, into the funnel 19 and runs out of its opening 21 in the form of a thin powder thread. The exiting powder is admixed in a manner known per se to a gaseous conveying medium, for example, air and fed to a dusting device with a nozzle or the like.

It has been ascertained that due to the design of the stirring mechanism rotating in the supply container 1, in the form of a stirring blade 5, which rotates immediately above the bottom 2 and the outlet opening 8, agglomerates of the powder are separated before entering the pipe 9. Lump formation in the powder fed to the oscillating plate 16 is therefore reliably prevented. On account of the inharmonic shaking motion of the oscillating plate 16, the powder is transferred completely and in metered quantitative proportions into the funnel 19.

The stirring blade 5 and the oscillating plate 16 are driven by the common motor 3, which, in contrast to known apparatus, eliminates a separate, for example, electromagnetic drive for the oscillating plate.

As illustrated, a conical annular sieve 23, open at the top, is rotatably connected (via a screw 22) to the stirring blade 5 and the shaft 4, so that it rotates jointly with the blade 5 in the quantity of powder contained in the container 1. It has been ascertained that on account of the rotation of the stirring blade 5 in the immediate proximity of the bottom 2, a toroidal powder motion occurs within the quantity of powder contained in the container 1, with a motion component directed upwardly in the proximity of the container wall and downwardly in the proximity of the center axis of the container, into the annular sieve 23. Ultimately, the powder which is moved towards the outlet opening 8 must, therefore, at some point in time, pass through the annular sieve 23. In this way, it is possible to gradually sieve the total quantity of powder with a relatively small sieve and to prevent foreign matter from reaching the outlet opening 8. This also increases the operational reliability of the metering device to a considerable degree. Instead of a conical annular sieve, a cylindrical, in particular, a circular cylindrical one, may also be used. The diameter of the annular sieve 23 may be substantially smaller than the external diameter of the stirring blade 5 and may, for example, be from one third to one fifth of this diameter.

Arrangement of the drive motor 3 beneath the container 1 not only enables in the simplest manner joint driving of stirring blade 5 and oscillating plate 16, but also contributes towards reducing the overall height of the total apparatus.

An emptying opening 24, into which a pipe connection piece 25 with a cover 26 is inserted, may be provided at the bottom 2 of the apparatus, in approximately diametrically opposed relationship to the outlet opening 8. This enables easy emptying of the container 1.

The metered and conveyed quantity of powder depends substantially on the oscillation amplitude of the oscillating plate 16 connected to the lever 13. An adjustable stop 27 formed by the end of a screw 29 mounted in a mounting section 28 with an adjusting knob 31, is provided for making this amplitude of the oscillating plate 16 settable, in order to change the metered quantity of powder. The further the stop 27 is adjusted towards the spring 14 (towards the left in FIG. 2), the less is the depth to which the follower 15 can drop into a gap between two teeth of the cam disk 11 because it is prevented from doing so by resting against the stop 27. The oscillating plate 16 now executes an inharmonic motion, whose "zero line" is illustrated by dashes in FIG. 3 and designated by reference numeral 30. In FIG. 3, the maximum amplitude of the oscillating plate 16 when the stop 27 is fully drawn back (towards the right in FIG. 2), is designated by c, and, as opposed to this, the amplitude reduced by appropriate adjustment of the stop 27, by d.

The advantage of this mechanical setting of the oscillation amplitude over a hitherto conventional electric setting by altering the operating voltage applied to an electromagnet is that one is no longer dependent on voltage tolerances. The oscillation amplitude setting provided here is, therefore, more accurate. The granular size, the specific weight and the pourability of commonly used powder sorts are different. In order to take these parameters into account, it is, therefore, expedient for the distance between the pipe 9 and the oscillating plate 16 to be adjustable. This can be achieved in a simple manner by, for example, arranging the pipe 9 in an axially displaceable and lockable manner in the outlet opening 8.

The higher the speed difference between the to and fro motion of the oscillating plate 16, the more effective is its metering or conveying action on the powder. The force with which the spring 14 prestresses the lever 13 carrying the oscillating plate 16 may, therefore, be made adjustable by, for example, a mounting section 32 on which the spring 14 is supported at one side, being of displaceable and adjustable design. It is thereby possible to increase the acceleration of the oscillating plate 16, which goes back to the spring force, when the follower 15 drops into a tooth gap in the cam disk 11.

Finally, it is expedient for the container 1 with bottom 2 and stirring blade 5 to be of removable design, so as to thereby enable a quick changing of the powder. For this purpose, the shaft 4, on which the stirring blade 5 and the cam disk 11 are mounted, comprises between these two parts a releasable coupling 33, for example, a claw coupling of the kind known per se, so that the powder supply container 1 with the stirring blade 5 may be removed and easily set on again after the powder has been replenished.

The frequency at which the oscillating plate 16 is driven may lie between 10 and 30 Hz, and may, for example, be 20 Hz, although other frequencies are also suitable. The maximum oscillation amplitude may be in the order of magnitude of millimeters.

What is claimed is:

1. Apparatus for metering dusting powder comprising a powder supply container, a powder outlet opening at the bottom of the supply container, a stirring mechanism comprising a stirring blade (5) rotating immediately above the bottom (2) and the outlet opening (8) of the supply container (1), an oscillating plate for metered delivery of the powder provided at the outlet opening, and a shaking device for imparting oscillatory motion to said plate, said shaking device comprising a lever (13) attached to said oscillating plate, a spring (14) for prestressing said lever, and a cam disk (11) for imparting to said lever an inharmonic oscillatory motion consisting of a slow motion to and a quick motion fro.

2. Apparatus as defeind in claim 1, characterized in that the stirring blade (5) and the oscillating plate (16) are driven by a common motor (3).

3. Apparatus as defined in claim 1, characterized in that an annular sieve (23) with a smaller diameter than the external diameter of the stirring blade is rigidly, coaxially arranged on the side of the rotating stirring blade (5) which faces away from the bottom (2) of the supply container (1).

4. Apparatus as defined in claim 2, characterized in that an annular sieve (23) with a smaller diameter than the external diameter of the stirring blade is rigidly, coaxially arranged on the side of the rotating stirring blade (5) which faces away from the bottom (2) of the supply container (1).

5. Apparatus as defined in claim 3, characterized in that the annular sieve (23) is of conical configuration.

6. Apparatus as defined in claim 4, characterized in that the annular sieve (23) is of conical configuration.

7. Apparatus as defined in claim 5, characterized in the provision of means for adjusting the force of the spring (14) prestressing the oscillating plate (16).

8. Apparatus as defined in claim 1, characterized in that the stirring blade (5) and the cam disk (11) are arranged on a common shaft (4) driven by the motor (3).

9. Apparatus as defined in claim 8, characterized in that the motor (3) is arranged beneath the bottom (2) of the supply container (1).

10. Apparatus as defined in claim 1, characterized in that a closeable emptying opening (24) is provided separately from the outlet opening (8) at the bottom (2) of the supply container (1).

11. Apparatus as defined in claim 1, characterized in the provision of means for setting the amplitude of the oscillating plate (16) for the purpose of altering the metered quantity of powder.

12. Apparatus as in claim 1, characterized in that the oscillating plate (16) is attached to a lever (13) which is prestressed by a spring (14) and to which an inharmonic motion is imparted by a cam disk (11), the amplitude of the oscillating plate (16) being settable for the purpose of altering the metered quantity of powder, the motion of the lever (13) being limited by an adjustable stop (27) in order to delimit its oscillation amplitude.

13. Apparatus as defined in claim 12, characterized in that the stirring blade (5) and the cam disk (11) sit on a common shaft (4), and the shaft (4) comprises a releasable coupling (33) between the stirring blade (5) and the cam disk (11) to enable removal of the powder powder supply container (1) containing the stirring blade (5).

14. Apparatus as defined in claim 1, characterized in that the oscillating plate (16) forms the bottom of a cup-shaped vessel into which a pipe (9) which is connected to the outlet opening (8) of the supply container (1) extends.

15. Apparatus as defined in claim 14, characterized in the provision of means for adjusting the distance of the pipe (9) from the oscillating plate (16) forming the bottom of the cup-shaped vessel.

16. Apparatus as defined in claim 14, characterized in that the cup-shaped vessel merges into a funnel (19) so as to concentrate the metered powder into a thin powder thread.

* * * * *